US009262037B2

(12) United States Patent
Mencke et al.

(10) Patent No.: US 9,262,037 B2
(45) Date of Patent: Feb. 16, 2016

(54) SELECTIVE CAPTURE OF INCOMING EMAIL MESSAGES FOR DIAGNOSTIC ANALYSIS

(71) Applicant: salesforce.com, inc., San Francisco, CA (US)

(72) Inventors: Rasmus Mencke, San Francisco, CA (US); Richard Alan Stevens, Odessa, FL (US); Brian St. Clair, Lutz, FL (US)

(73) Assignee: salesforce.com, inc., San Francisco, CA (US)

( * ) Notice: Subject to any disclaimer, the term of this patent is extended or adjusted under 35 U.S.C. 154(b) by 275 days.

(21) Appl. No.: 13/828,956

(22) Filed: Mar. 14, 2013

(65) Prior Publication Data
US 2013/0290869 A1    Oct. 31, 2013

Related U.S. Application Data

(60) Provisional application No. 61/640,507, filed on Apr. 30, 2012.

(51) Int. Cl.
*G06F 3/048*  (2013.01)
*H04L 12/58*  (2006.01)
*G06Q 10/10*  (2012.01)

(52) U.S. Cl.
CPC .............. *G06F 3/048* (2013.01); *G06Q 10/107* (2013.01); *H04L 51/00* (2013.01); *H04L 51/30* (2013.01); *H04L 51/34* (2013.01)

(58) Field of Classification Search
CPC ......... G06F 3/048; H04L 51/30; H04L 51/00; G06Q 10/107
USPC .......................................................... 715/752
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,917,489 A * | 6/1999 | Thurlow et al. | 715/809 |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

*Primary Examiner* — Rashawn Tillery
(74) *Attorney, Agent, or Firm* — Ingrassia Fisher & Lorenz, P.C.

(57) ABSTRACT

A method for processing email is presented here. The method begins by receiving email capture criteria for incoming email messages directed to a destination tenant of a multi-tenant database system. The method continues by comparing the email capture criteria to searchable information conveyed in the incoming email messages. When the searchable information in a candidate email message of the incoming email messages matches the email capture criteria by at least a threshold amount, the candidate email message is identified as a matched email message. The method continues by saving a copy of the matched email message for diagnostic analysis, and performing incoming email processing on the matched email message.

22 Claims, 8 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 7,783,706 B1 * | 8/2010 | Robinson ...... 709/206 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0174185 A1 * | 11/2002 | Rawat et al. ...... 709/206 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0095527 A1 * | 5/2006 | Malik ...... 709/206 |
| 2007/0192416 A1 * | 8/2007 | Gupta ...... 709/206 |
| 2008/0294515 A1 * | 11/2008 | Rupp ...... 705/14 |
| 2009/0063415 A1 | 3/2009 | Chatfield et al. |
| 2010/0076989 A1 * | 3/2010 | Jakobson ...... 707/758 |

* cited by examiner

SELECTIVE CAPTURE OF INCOMING EMAIL MESSAGES FOR DIAGNOSTIC ANALYSIS

CROSS-REFERENCE TO RELATED APPLICATION

This application claims the benefit of U.S. provisional patent application number 61/640,507, filed Apr. 30, 2012.

TECHNICAL FIELD

Embodiments of the subject matter described herein relate generally to email systems. More particularly, embodiments of the subject matter relate to a troubleshooting technique that selectively captures incoming email messages for analysis.

BACKGROUND

The prior art is replete with a variety of different computer-based email systems and related email delivery, processing, and presentation techniques. A typical email system employs a mail server that receives email messages directed to a particular domain and routes the incoming email as needed to the intended recipient. A multi-tenant database system may also support email features and functionality for a plurality of different tenants. The multi-tenant environment, however, can present certain challenges and difficulties when diagnosing or analyzing email delivery problems. For example, it may be necessary for the provider or administrator of the multi-tenant database system to respond to email "trouble tickets" associated with email problems for a large number of different tenants. Providing such email support to many different tenants can be time consuming, costly, and a drain on human resources. Moreover, determining the cause of email delivery problems may be a difficult task when dealing with multiple tenants accessing a multi-tenant database system, because a multi-tenant database system may support many tenants accessing the system at any given moment, with each tenant being managed by one or more administrators or users with certain access privileges.

Accordingly, it is desirable to have an efficient and effective methodology for monitoring and diagnosing email delivery issues, particularly in the context of a multi-tenant database application. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented here relate to computer-implemented techniques and methodologies for the handling and processing of email messages. More specifically, the subject matter described here enables an administrator (or any authorized user) to quickly and easily create "inbound email snapshot" requests in an attempt to capture incoming email that satisfies certain criteria. Capturing email messages in this manner allows the administrator to perform basic troubleshooting tasks in an efficient manner that need not involve outside support services or a third party IT department. In certain embodiments, the user logs into the host system (which may correspond to one tenant of a multi-tenant database system) via a web browser application of a client device, wherein the web browser renders an interactive graphical user interface (GUI) that facilitates the creation and handling of snapshot requests. For example, the GUI may allow the user to define email search or filter criteria associated with the email recipient and/or associated with the email sender, wherein the criteria applies to incoming email messages directed to that particular tenant. Accordingly, issues with respect to receiving, logging, and processing inbound emails sent to a multi-tenant database system can be analyzed and identified in a more isolated and tenant-specific manner. Particular embodiments described here are designed to capture and inspect email messages after they arrive but before they are processed for delivery, to thereby identify any potential or existing issues.

Figure 1:
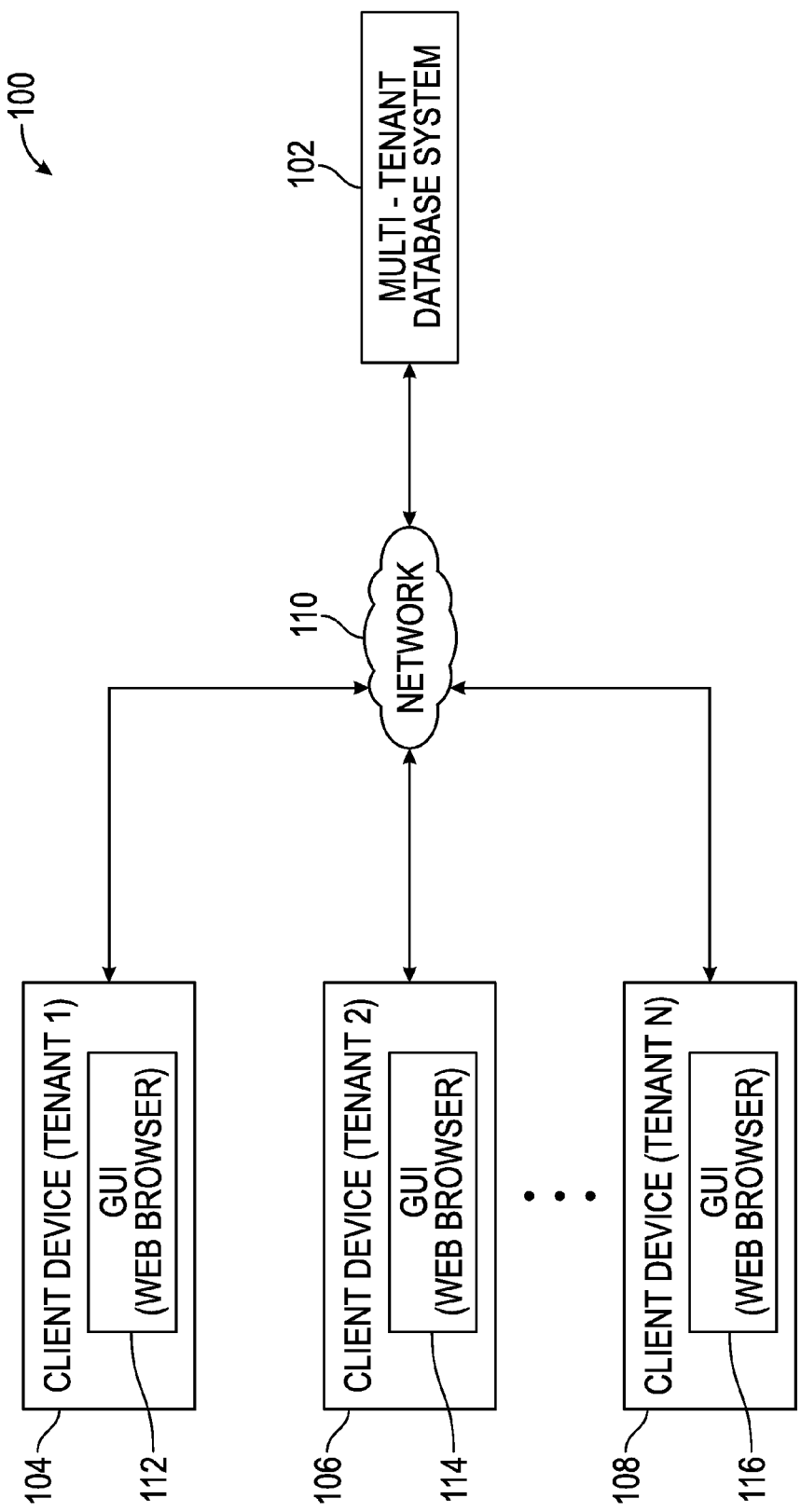
FIG. 1 is a schematic representation of an exemplary embodiment of a computer-implemented multi-tenant system.

Referring now to the drawings, FIG. 1 is a schematic representation of an exemplary embodiment of a computer-implemented multi-tenant system 100, which is suitably configured to support email functionality, including the monitoring, capturing, and diagnostic processes described in more detail herein. More particularly, the system 100 supports the delivery and processing of incoming email messages that may be destined for any of the tenants supported by a multi-tenant database system 102, wherein the incoming email messages are received by a mail transfer agent or email server of the multi-tenant database system 102 for processing, routing, and delivery to the intended recipients.

The system 100 is focused around the multi-tenant database system 102, which may be implemented as one or more computer-based server devices. For simplicity and ease of description, FIG. 1 depicts the multi-tenant database system 102 as a single block or component. The system 100 may include any number of client devices operating in association with any number of tenants. In practice, each tenant supported by the multi-tenant database system 102 will typically have a plurality of distinct client devices associated therewith. For example, a first tenant may support thousands of users via a like number of physically distinct client devices, and a second tenant may support only ten different users that share five client devices. For simplicity, FIG. 1 depicts a first client device 104 (which is associated with a first tenant, Tenant 1), a second client device 106 (which is associated with a second tenant, Tenant 2), and a third client device 108 (which is associated with an arbitrarily numbered tenant, Tenant N). Of course, the system 100 may be arranged in any suitable configuration as needed to support the desired number of tenants and the desired number of client devices. The system 100 is preferably realized as a computer-implemented system in that the client devices 104, 106, 108 and the multi-tenant database system 102 are configured as computer-based electronic devices.

Each client device supported by the system 100 is realized as a computer-implemented or computer-based device having the hardware, software, firmware, and/or processing logic needed to carry out the various techniques and methodologies described in more detail herein. In certain embodiments, each of the client devices 104, 106, 108 is operatively coupled to the multi-tenant database system 102 through a data communication network 110. Each client device supported by the system 100 may be implemented using any suitable hardware platform. In this regard, a client device may be realized in any common form factor including, without limitation: a desktop computer; a mobile computer (e.g., a tablet computer, a laptop computer, or a netbook computer); a smartphone; a video game device; a digital media player; a piece of home entertainment equipment; or the like. In certain embodiments, the system 100 is a cloud-based computing system in that each client device communicates with the multi-tenant database system 102 via a respective graphical user interface (GUI) such as a web browser, which executes locally at the client device. Accordingly, FIG. 1 depicts a GUI application 112 associated with the client device 104, a GUI application 114 associated with the client device 106, and a GUI application 116 associated with the client device 108.

The multi-tenant database system 102 can be deployed in certain embodiments of the system 100 to manage, handle, and otherwise carry out the email capturing, processing, and displaying techniques described in more detail below. In practice, the multi-tenant database system 102 may be realized as a computer-implemented or computer-based system having the hardware, software, firmware, and/or processing logic needed to carry out the various processes, techniques, and methodologies described in more detail herein. It should be appreciated that the multi-tenant database system 102 need not be deployed in single-tenant embodiments or in embodiments where the client devices 104, 106, 108 perform the desired functionality. In other words, the methodology described herein could be implemented at the local client device level without relying on any centralized processing at the server level. Moreover, in certain embodiments the desired functionality could be executed or performed in a distributed manner across the multi-tenant database system 102 and one or more of the client devices 104, 106, 108.

The data communication network 110 provides and supports data connectivity between the client devices 104, 106, 108 and the multi-tenant database system 102. In practice, the data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range protocol, e.g., the BLUETOOTH protocol.

The exemplary embodiments presented here relate to various computer-implemented and computer-executed techniques related to email systems and techniques for capturing email messages based on the satisfaction of designated capture criteria. The described subject matter could be implemented in connection with any suitable computer-based architecture, system, network, or environment, such as two or more user devices that communicate via a data communication network. Although the subject matter presented here could be utilized in connection with any type of computing environment, certain exemplary embodiments can be implemented in conjunction with a multi-tenant database environment, such as the system 100 shown in FIG. 1.

Figure 2:
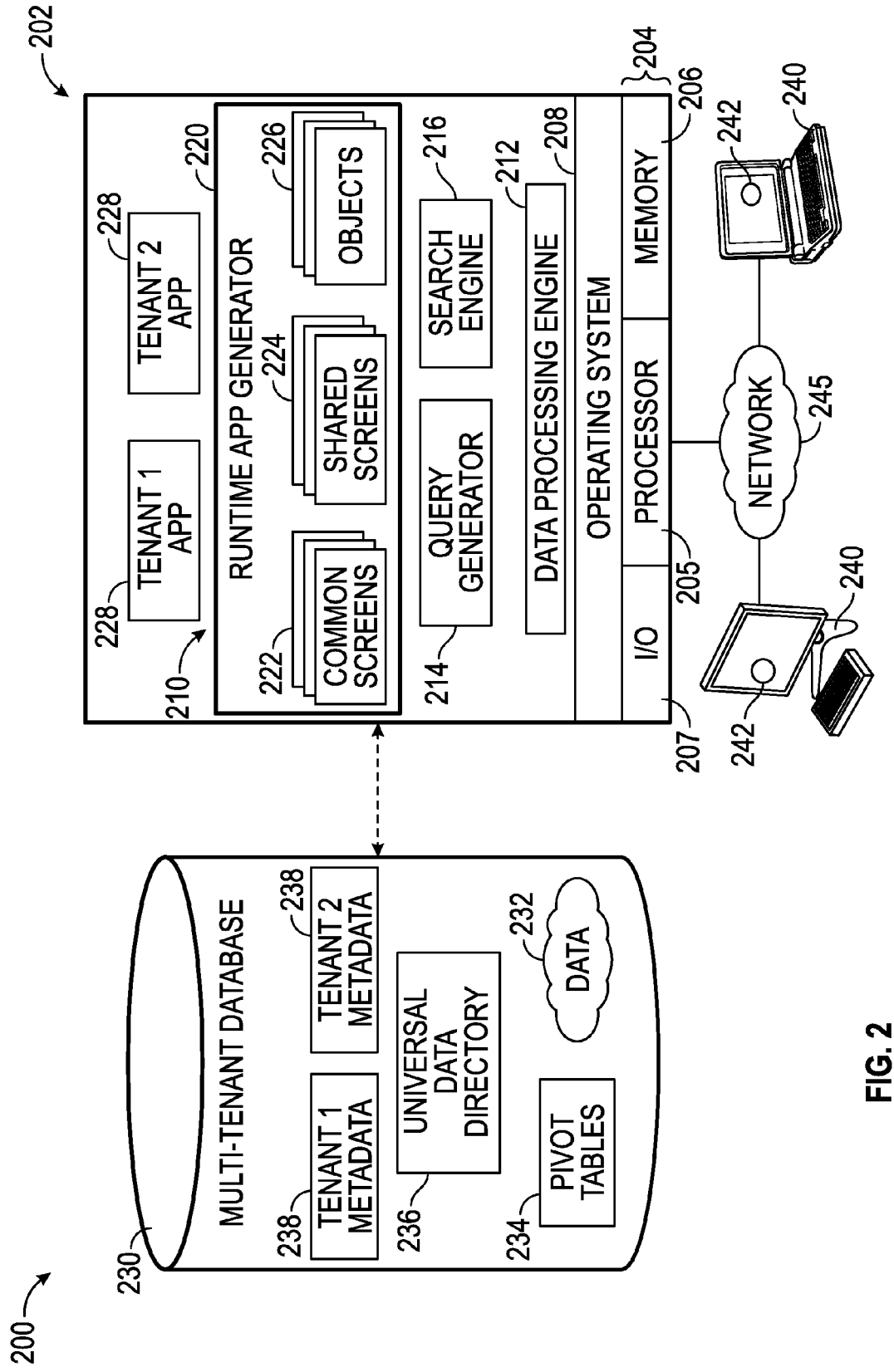
FIG. 2 is a schematic representation of an exemplary embodiment of a multi-tenant database system.

In this regard, an exemplary embodiment of a multi-tenant database system 200 is shown in FIG. 2. The system 200 suitably includes a server 202 that dynamically creates virtual applications 228 based upon data 232 from a common database 230 that is shared between multiple tenants. Data and services generated by the virtual applications 228 are provided via a network 245 to any number of user devices 240, as desired. Each virtual application 228 is suitably generated at run-time using a common application platform 210 that securely provides access to the data 232 in the database 230 for each of the various tenants subscribing to the system 200. In accordance with one non-limiting example, the system 200 may be implemented in the form of a multi-tenant customer relationship management system that can support any number of authenticated users of multiple tenants.

A "tenant" or an "organization" generally refers to a group of users that shares access to common data within the database 230. Tenants may represent customers, customer departments, business or legal organizations, and/or any other entities that maintain data for particular sets of users within the system 200. Although multiple tenants may share access to the server 202 and the database 230, the particular data and services provided from the server 202 to each tenant can be securely isolated from those provided to other tenants. The multi-tenant architecture therefore allows different sets of users to share functionality without necessarily sharing any of the data 232.

The database 230 is any sort of repository or other data storage system capable of storing and managing the data 232 associated with any number of tenants. The database 230 may be implemented using any type of conventional database server hardware. In various embodiments, the database 230 shares processing hardware 204 with the server 202. In other embodiments, the database 230 is implemented using separate physical and/or virtual database server hardware that communicates with the server 202 to perform the various functions described herein.

The data 232 may be organized and formatted in any manner to support the application platform 210. In various embodiments, the data 232 is suitably organized into a relatively small number of large data tables to maintain a semi-amorphous "heap"-type format. The data 232 can then be organized as needed for a particular virtual application 228.

In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238 for each tenant, as desired. Rather than forcing the data 232 into an inflexible global structure that is common to all tenants and applications, the database 230 is organized to be relatively amorphous, with the pivot tables 234 and the metadata 238 providing additional structure on an as-needed basis. To that end, the application platform 210 suitably uses the pivot tables 234 and/or the metadata 238 to generate "virtual" components of the virtual applications 228 to logically obtain, process, and present the relatively amorphous data 232 from the database 230.

The server 202 is implemented using one or more actual and/or virtual computing systems that collectively provide the dynamic application platform 210 for generating the virtual applications 228. The server 202 operates with any sort of conventional processing hardware 204, such as a processor 205, memory 206, input/output features 207 and the like. The processor 205 may be implemented using one or more of microprocessors, microcontrollers, processing cores and/or other computing resources spread across any number of distributed or integrated systems, including any number of "cloud-based" or other virtual systems. The memory 206 represents any non-transitory short or long term storage capable of storing programming instructions for execution on the processor 205, including any sort of random access memory (RAM), read only memory (ROM), flash memory, magnetic or optical mass storage, and/or the like. The server 202 typically includes or cooperates with some type of computer-readable media, where a tangible computer-readable medium has computer-executable instructions stored thereon. The computer-executable instructions, when read and executed by the server 202, cause the server 202 to perform certain tasks, operations, functions, and processes described in more detail herein. In this regard, the memory 206 may represent one suitable implementation of such computer-readable media. Notably, the processor 205 and the memory 206 may be suitably configured to carry out the various email processing and related features described herein.

The input/output features 207 represent conventional interfaces to networks (e.g., to the network 245, or any other local area, wide area or other network), mass storage, display devices, data entry devices and/or the like. In a typical embodiment, the application platform 210 gains access to processing resources, communications interfaces and other features of the processing hardware 204 using any sort of conventional or proprietary operating system 208. As noted above, the server 202 may be implemented using a cluster of actual and/or virtual servers operating in conjunction with each other, typically in association with conventional network communications, cluster management, load balancing and other features as appropriate.

The application platform 210 is any sort of software application or other data processing engine that generates the virtual applications 228 that provide data and/or services to the user devices 240. The virtual applications 228 are typically generated at run-time in response to queries received from the user devices 240. For the illustrated embodiment, the application platform 210 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

The runtime application generator 220 dynamically builds and executes the virtual applications 228 in response to specific requests received from the user (client) devices 240. The virtual applications 228 created by tenants are typically constructed in accordance with the tenant-specific metadata 238, which describes the particular tables, reports, interfaces and/or other features of the particular application. In various embodiments, each virtual application 228 generates dynamic web content (including GUIs, detail views, secondary or sidebar views, and the like) that can be served to a browser or other client program 242 associated with its user device 240, as appropriate.

The runtime application generator 220 suitably interacts with the query generator 214 to efficiently obtain multi-tenant data 232 from the database 230 as needed. In a typical embodiment, the query generator 214 considers the identity of the user requesting a particular function, and then builds and executes queries to the database 230 using system-wide metadata 236, tenant specific metadata 238, pivot tables 234, and/or any other available resources. The query generator 214 in this example therefore maintains security of the common database 230 by ensuring that queries are consistent with access privileges granted to the user that initiated the request.

The data processing engine 212 performs bulk processing operations on the data 232 such as uploads or downloads, updates, online transaction processing, and/or the like. In many embodiments, less urgent bulk processing of the data 232 can be scheduled to occur as processing resources become available, thereby giving priority to more urgent data processing by the query generator 214, the search engine 216, the virtual applications 228, etc. In certain embodiments, the data processing engine 212 and the processor 205 cooperate in an appropriate manner to perform and manage various techniques, processes, and methods associated with email processing, as described in more detail below.

In operation, developers use the application platform 210 to create data-driven virtual applications 228 for the tenants that they support. Such virtual applications 228 may make use of interface features such as tenant-specific screens 224, universal screens 222 or the like. Any number of tenant-specific and/or universal objects 226 may also be available for integration into tenant-developed virtual applications 228. The data 232 associated with each virtual application 228 is provided to the database 230, as appropriate, and stored until it is requested or is otherwise needed, along with the metadata 238 that describes the particular features (e.g., reports, tables, functions, etc.) of that particular tenant-specific virtual application 228. For example, a virtual application 228 may include a number of objects 226 accessible to a tenant, wherein for each object 226 accessible to the tenant, information pertaining to its object type along with values for various fields associated with that respective object type are maintained as metadata 238 in the database 230. In this regard, the object type defines the structure (e.g., the formatting, functions and other constructs) of each respective object 226 and the various fields associated therewith. In an exemplary embodiment, each object type includes one or more fields for indicating the relationship of a respective object of that object type to one or more objects of a different object type (e.g., master-detail, lookup relationships, or the like).

In exemplary embodiments, the application platform 210, the data processing engine 212, the query generator 214, and the processor 205 cooperate in an appropriate manner to process data associated with a hosted virtual application 228 (such as a customer relationship management application), generate and provide suitable GUIs (such as web pages) for presenting data on client devices 240, and perform additional techniques, processes, and methods to support the features and functions for the hosted virtual application 228.

Still referring to FIG. 2, the data and services provided by the server 202 can be retrieved using any sort of personal computer, mobile telephone, portable device, tablet computer, or other network-enabled user device 240 that communicates via the network 245. Typically, the user operates a conventional browser or other client program 242 to contact the server 202 via the network 245 using, for example, the hypertext transport protocol (HTTP) or the like. The user typically authenticates his or her identity to the server 202 to obtain a session identifier ("SessionID") that identifies the user in subsequent communications with the server 202. When the identified user requests access to a virtual application 228, the runtime application generator 220 suitably creates the application at run time based upon the metadata 238, as appropriate. The query generator 214 suitably obtains the requested data 232 from the database 230 as needed to populate the tables, reports or other features of the particular virtual application 228. As noted above, the virtual application 228 may contain JAVA program content, ACTIVEX program content, or other content that can be presented using conventional client software running on the user device 240; other embodiments may simply provide dynamic web or other content that can be presented and viewed by the user, as desired.

Figure 3:
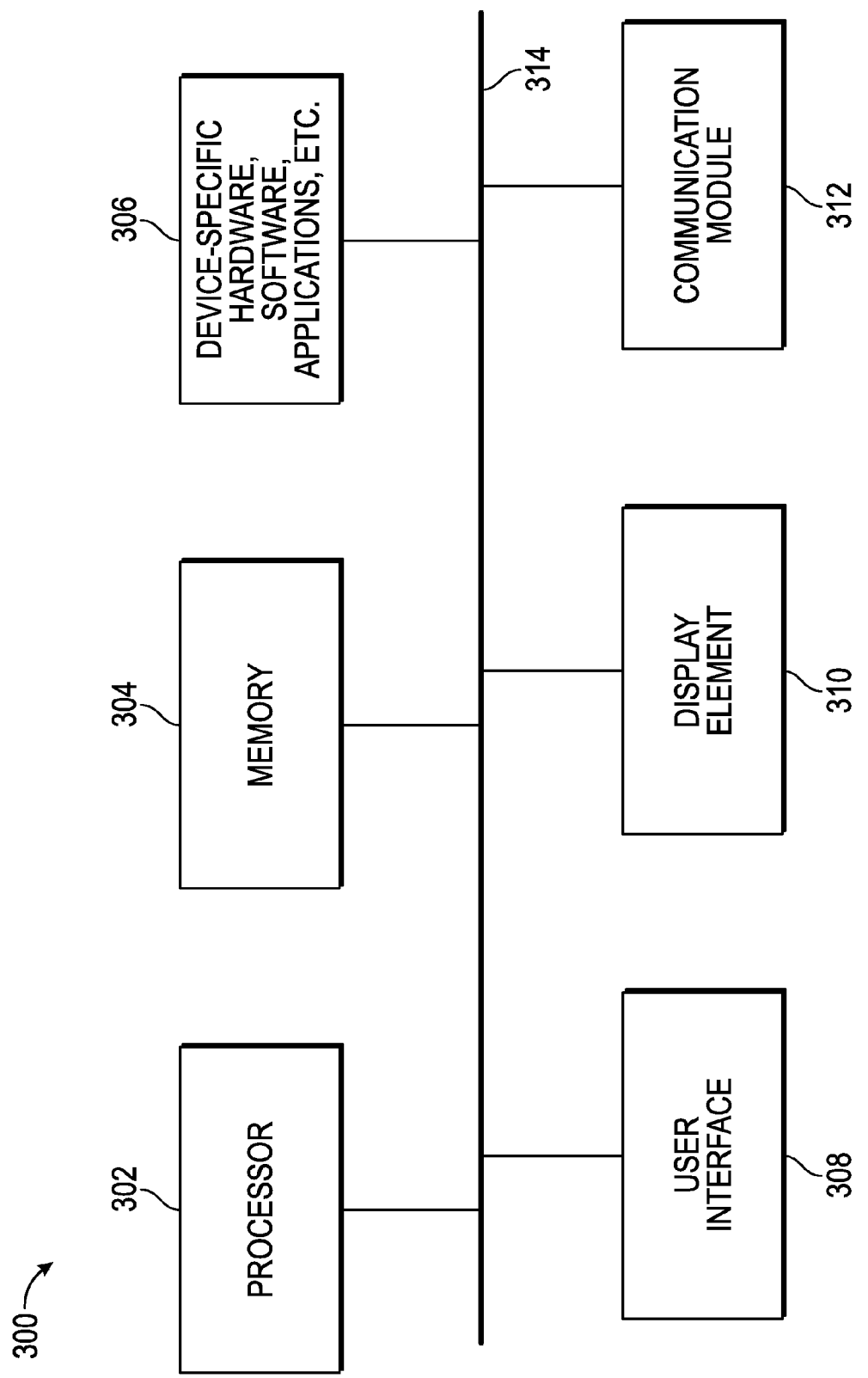
FIG. 3 is a simplified block diagram representation of an exemplary embodiment of a computer-implemented device suitable for use in a multi-tenant system such as that depicted in FIG. 1.

FIG. 3 is a simplified block diagram representation of an exemplary embodiment of a computer-implemented device 300 suitable for use in a multi-tenant system such as that depicted in FIG. 1. In practice, the client devices 104, 106, 108 and the multi-tenant database system 102 could be generally configured and implemented as shown in FIG. 3. The illustrated embodiment of the device 300 includes, without limitation: at least one processor 302; a suitable amount of memory 304; device-specific hardware, software, firmware, and/or applications 306; a user interface 308; a display element 310; and a communication module 312. Of course, the device 300 may include additional elements, components, modules, and functionality configured to support various features that are unrelated to the subject matter described here. For example, the device 300 may include certain features and elements to support conventional functions that might be related to the particular implementation and deployment of the device 300. In practice, the elements of the device 300 may be coupled together via a bus or any suitable interconnection architecture 314.

The processor 302 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 304 may be realized as RAM memory, flash memory, EPROM memory, EEPROM memory, registers, a hard disk, a removable disk, a CD-ROM, or any other form of storage medium known in the art. In this regard, the memory 304 can be coupled to the processor 302 such that the processor 302 can read information from, and write information to, the memory 304. In the alternative, the memory 304 may be integral to the processor 302. As an example, the processor 302 and the memory 304 may reside in an ASIC. The memory 304 can be used to store computer-readable media, where a tangible computer-readable medium has computer-executable instructions stored thereon (accordingly, the computer-readable medium is typically non-transitory in nature). The computer-executable instructions, when read and executed by the device 300, cause the device 300 to perform certain tasks, operations, functions, and processes described in more detail herein. In this regard, the memory 304 may represent one suitable implementation of such computer-readable media. Alternatively or additionally, the device 300 could receive and cooperate with computer-readable media (not separately shown) that is realized as a portable or mobile component or platform, e.g., a portable hard drive, a USB flash drive, an optical disc, or the like.

The device-specific hardware, software, firmware, and applications 306 may vary from one embodiment of the device 300 to another. For example, the device-specific hardware, software, firmware, and applications 306 will support telephone functions and features when the device 300 is realized as a mobile telephone, conventional personal computer functions and features if the device 300 is realized as a desktop or portable computer, and server functions and features if the device 300 is realized as a server system (including, in certain embodiments, web server functionality). In practice, certain portions or aspects of the device-specific hardware, software, firmware, and applications 306 may be implemented in one or more of the other blocks depicted in FIG. 3.

The user interface 308 may include or cooperate with various features to allow a user to interact with the device 300. Accordingly, the user interface 308 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 300. In various embodiments, the user interface 308 may include one or more graphical user interface (GUI) control elements that enable a user to manipulate or otherwise interact with an application via the display element 310.

The communication module 312 facilitates data communication between the device 300 and other components as needed during the operation of the device 300. An embodiment of the device 300 may support wireless data communication and/or wired data communication, using various data communication protocols. For example, the communication module could support one or more wireless data communication protocols, techniques, or methodologies, including, without limitation: RF; infrared; the BLUETOOTH wireless protocol; the ZIGBEE protocol (and other variants of the IEEE 802.15protocol); IEEE 802.11(any variation); IEEE 802.16(using the WIMAX standard or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394; hospital network communication protocols; and proprietary data communication protocols.

The display element 310 is suitably configured to enable the device 300 to render and display various screens, GUIs, GUI control elements, drop down menus, auto-fill fields, text entry fields, message fields, or the like. Of course, the display element 310 may also be utilized for the display of other information during the operation of the device 300, as is well understood. Notably, the specific configuration, operating characteristics, size, resolution, and functionality of the display element 310 can vary depending upon the practical implementation of the device 300. For example, if the device 300 is a desktop computer, then the display element 310 may be a relatively large monitor. Alternatively, if the device 300 is a cellular telephone device, then the display element 310 may be a relatively small integrated display screen, which may be realized as a touch screen.

Figure 4:
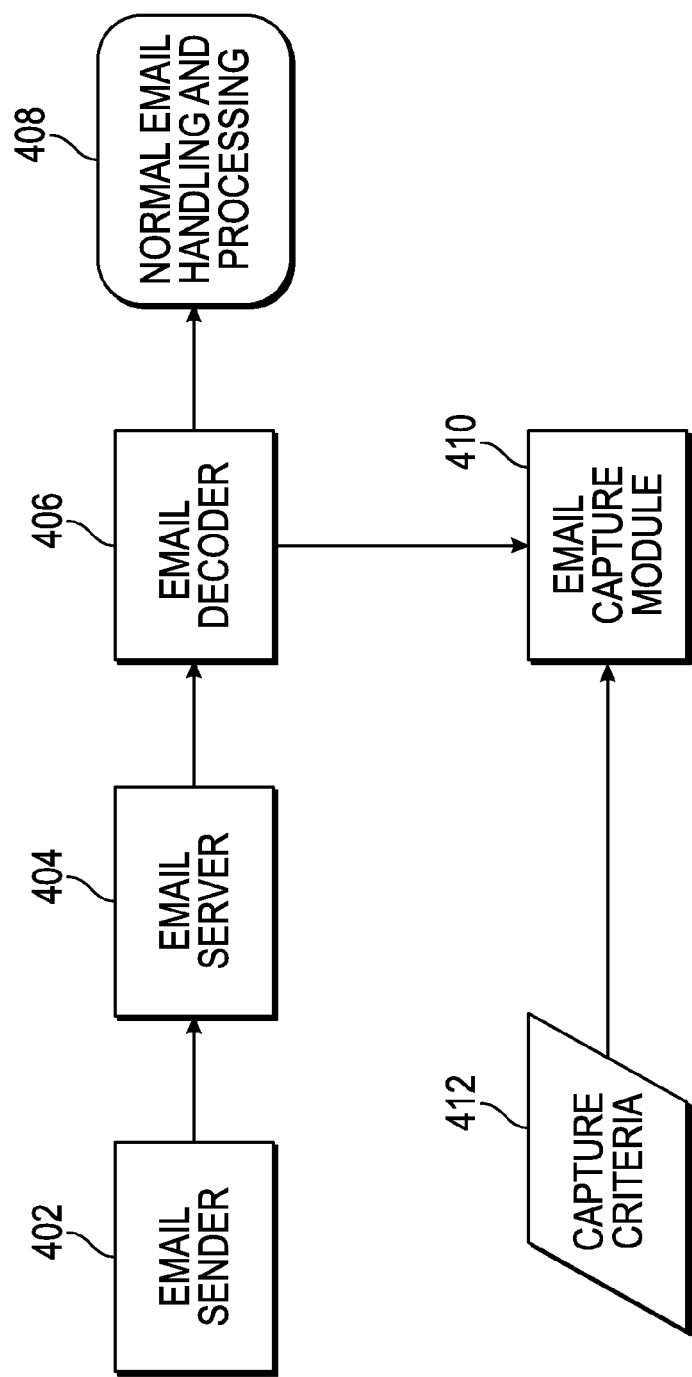
FIG. 4 is a diagram that illustrates an email processing flow according to certain embodiments.

FIG. 4 is a diagram that illustrates a typical email processing flow in a generalized manner. This example assumes that at least one email sender 402 sends email messages to an email server 404, a mail transfer agent, or the like, wherein the email server 404 is associated with or is considered to be a part of a multi-tenant database system. In certain embodiments, the email server 404 supports a plurality of different tenants/organizations of the multi-tenant database system. In other embodiments, each tenant/organization supported by the multi-tenant database system may have its own email server 404 assigned thereto. For purposes of this description, it is assumed that the email server 404 handles incoming email messages for a plurality of different tenants. Therefore, one function of the email server 404 is to process the incoming email messages to determine which tenant is the intended destination tenant.

In certain implementations, each incoming email message ends with a common domain string that corresponds to the particular multi-tenant database system, regardless of which tenant the incoming email is directed to. For example, all of the incoming email messages may end in ".acmeABC.com" to identify the multi-tenant database provider "Acme ABC" as the host multi-tenant database system. An incoming email message may be a "traditional" email that is directed to a designated user (or any standard email address) of one of the tenants supported by the multi-tenant database system. Alternatively, an incoming email message may be a "function-specific" or a "feature-specific" email message that is directed to an internal process or application of the multi-tenant database system for purposes of initiating a task, routine, or function. For example, a customer relationship management (CRM) application supported by the multi-tenant database system may include an "email-to-CRM" feature, wherein a special email address can be entered as a recipient (e.g., a BCC recipient) when creating, forwarding, or replying to an email message. The email-to-CRM feature responds to the special email address by assigning the email message to a record maintained by the CRM application for the particular tenant (e.g., a lead, contact, or opportunity record). As another example, a CRM application may include an "email-to-case" feature, wherein incoming email directed to a defined email address, such as a customer service email address, is processed to automatically create a customer support case or ticket for the particular tenant. These examples are not exhaustive, and are not intended to limit or otherwise restrict the application or scope of the described subject matter.

After receiving the incoming email messages, the email server 404 may direct the incoming email messages to an email decoder 406. This example assumes that the email server 404 receives incoming email messages in an original format, and that the email decoder 406 decodes the originally formatted email messages to obtain searchable information that is conveyed in the incoming email messages. In this regard, email addresses handled by the multi-tenant database system may be encoded or encrypted in any appropriate manner to convey additional information, which may include certain types of searchable information. For example, a somewhat simple and traditionally formatted email address may be encoded to contain information that can be internally analyzed and processed by the multi-tenant database system. Such additional details, metadata, and/or information need not be visible to the end users, and the end users need not know that their email addresses represent encoded data. The information encoded into an email address may include, without limitation: an expanded or complete recipient email address; a tenant or organization identifier associated with the incoming email (which in turn may be linked to a person, a feature of the multi-tenant database system, a function of the multi-tenant database system, or the like); a recipient email domain; a username associated with the incoming email; an identifier that indicates which instance of the multi-tenant database system is currently logged into; or the like. For the multi-tenant implementation described here, the tenant or organization identifier is important to allow the system to determine who the email is being processed for.

The decoded email information may be provided to an email capture module 410 of the multi-tenant database system, while the decoded email itself is handled as usual. In this regard, the multi-tenant database system can perform incoming email processing on decoded email messages and otherwise route, analyze, and/or process the incoming email in a normal and ordinary manner, as indicated by the procedure 408 in FIG. 4.

The email capture module 410, which may be realized as a processing module of the multi-tenant database system, is suitably configured to process incoming email messages and email capture criteria 412 to identify incoming email messages that match or otherwise satisfy the email capture criteria 412 (as described in more detail below). Notably, the email capture module 410 is designed to execute in parallel with the normal email processing flow. Accordingly, incoming email messages are still handled and processed as usual, while the email capture module 410 searches the incoming email stream for matching email messages.

Figure 5:
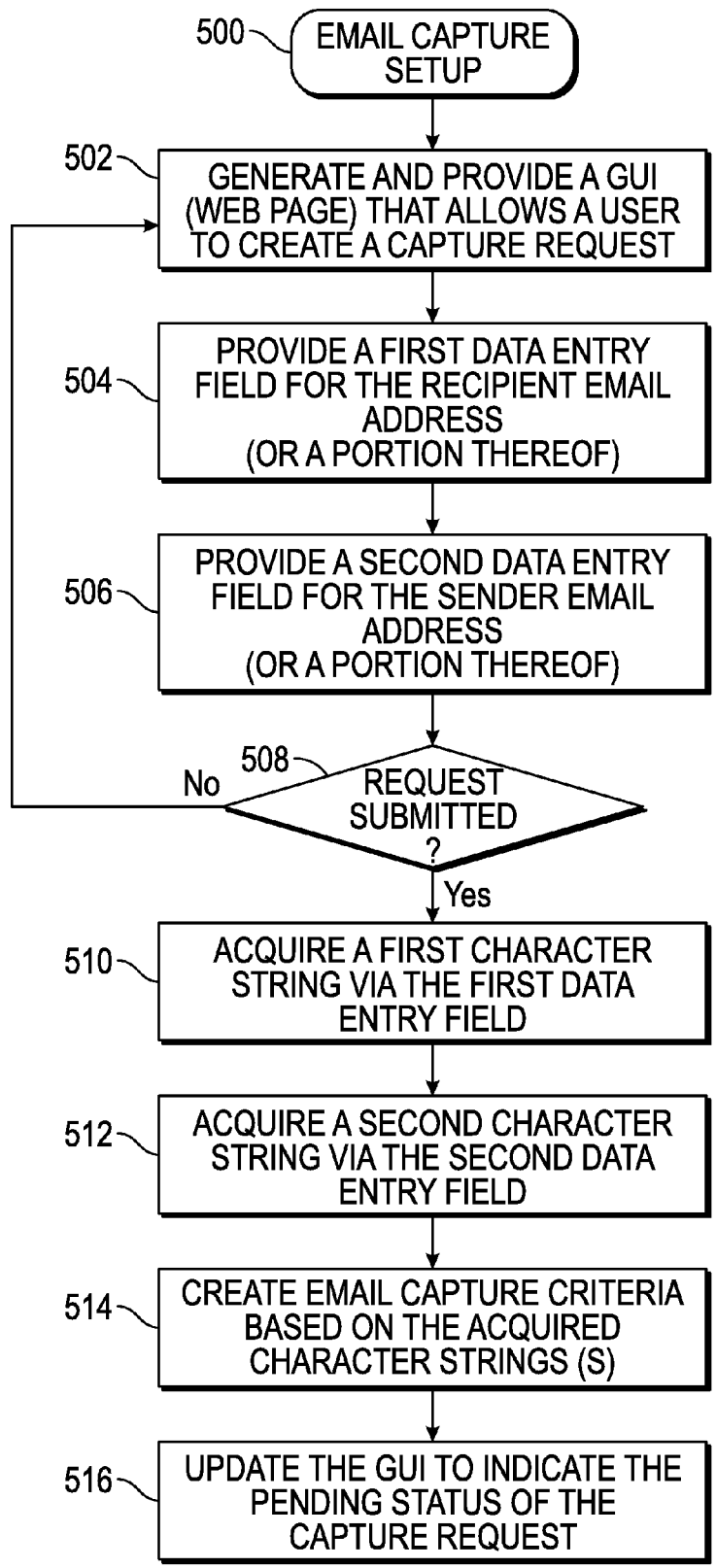
FIG. 5 is a flow chart that illustrates an embodiment of an email capture setup process.

FIG. 5 is a flow chart that illustrates an embodiment of an email capture setup process 500, which may be supported by the system 100 shown in FIG. 1. The various tasks performed in connection with a process described herein may be performed by software, hardware, firmware, or any combination thereof For illustrative purposes, the description of a process may refer to elements mentioned above in connection with FIGS. 1-4. In practice, portions of a described process may be performed by different elements of the described system, e.g., a multi-tenant database system, a client device, or a processing module thereof It should be appreciated that a process described here may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in the figures could be omitted from an embodiment of a described process as long as the intended overall functionality remains intact.

Figure 6:
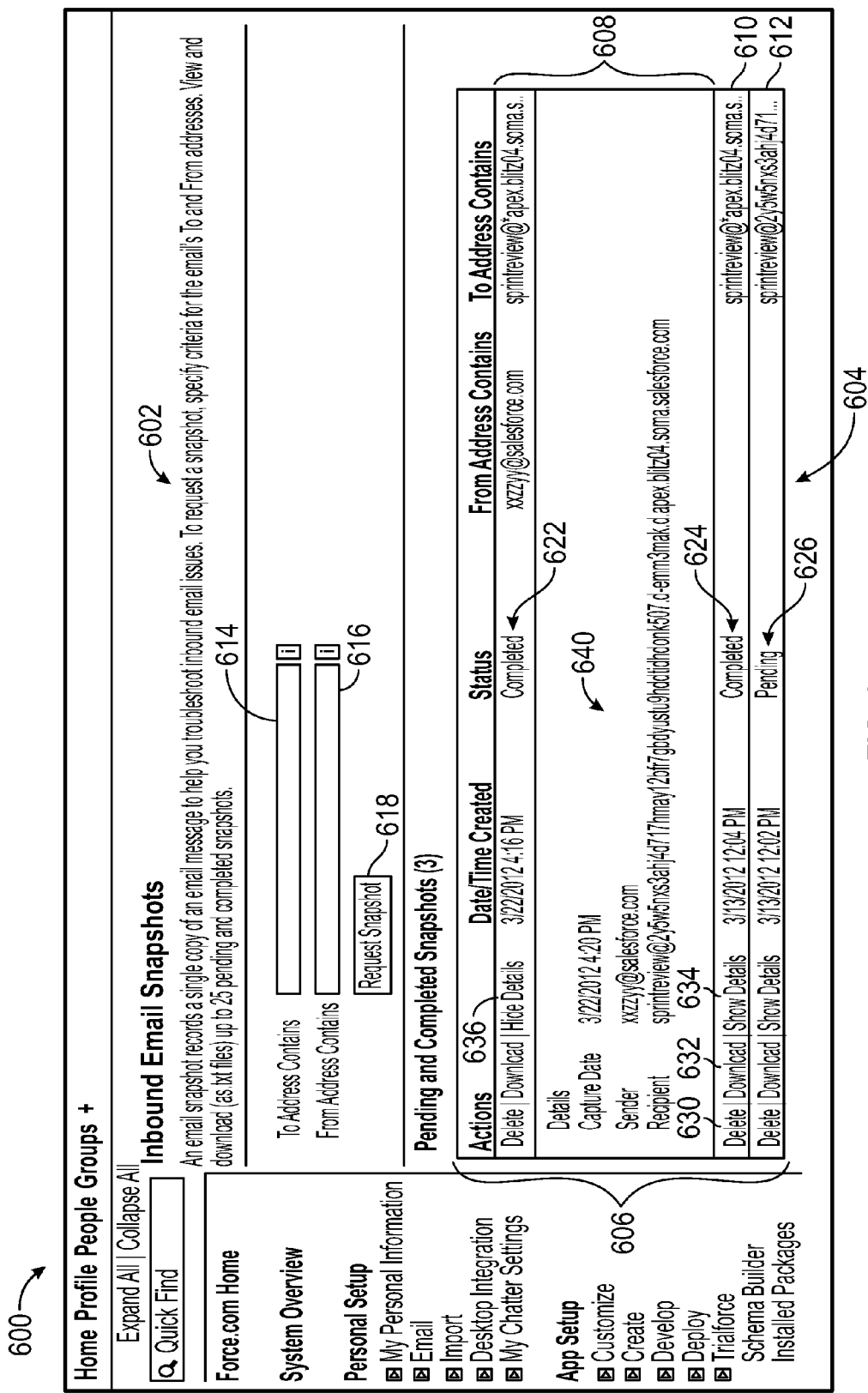
FIG. 6 represents a screen shot of an exemplary embodiment of a graphical user interface that can be used to support certain email processing techniques described herein.

The process 500 may be utilized to receive email capture criteria for incoming email messages directed to a destination tenant of a multi-tenant database system. In particular embodiments, the process 500 may generate and provide a suitably configured and formatted GUI to a client device (task 502). The GUI may be an interactive GUI that allows a user of the client device to configure and create one or more email capture requests as needed. In this regard, FIG. 6 represents a screen shot of an exemplary embodiment of an interactive GUI 600 that can be used to support certain email processing techniques described herein. Indeed, the GUI 600 may be generated and rendered at the client device in connection with the process 500. The GUI 600 can be generated and presented to the client device in response to the user logging into a tenant the multi-tenant database system, and then navigating a web browser application (via one or more links) to arrive at the GUI 600. In the illustrated embodiment, the GUI 600 is designed as an "Inbound Email Snapshots" screen.

Certain embodiments of the GUI 600 include an email capture request panel 602 and a status panel 604. The user of the client device interacts with the email capture request panel 602 to create new email capture requests (also referred to here as email "snapshots"). The status panel 604 includes a list of status entries 606 that correspond to previously entered email snapshots. The example shown in FIG. 6 includes three status entries 608, 610, 612, wherein the first status entry 608 has been expanded to show additional details. The email capture request panel 602 may include any number of data entry fields that allow the user to enter some or all of the email capture criteria for an email snapshot. The illustrated example includes a first data entry field 614 to receive at least a portion of a recipient email address, and a second data entry field 616 to receive at least a portion of a sender email address field. In practice, the user can enter a first character string in the first data entry field 614 and/or a second character string in the second data entry field 616. Any desired formatting rules may apply to the acquisition of these character strings. For example, the characters may be case sensitive or case insensitive, there may be a maximum character string length, spaces may be allowed or prohibited, certain characters may be invalid, and the like. In certain embodiments, wildcard characters (e.g., an asterisk character) can be utilized in the local portion of the email address (the part that occurs before the "@" character) and/or in the domain portion of the email address (the part that occurs after the "@" character).

The GUI 600 also includes an interactive "Request Snapshot" button 618 that is activated to create a new email capture request that includes the email capture criteria associated with the character strings entered into the first and second data entry fields 614, 616. Referring back to FIG. 5, the process provides a first data entry field (e.g., the first data entry field 614 shown in FIG. 6) for at least a portion of the desired recipient email address (task 504). Depending upon the particular embodiment, the information provided in the first data entry field may be used to search the content of the "To" field and/or the "CC" field of the incoming email messages. The process also provides a second data entry field (e.g., the second data entry field 616 shown in FIG. 6) for at least a portion of the desired sender email address (task 506). This example assumes that the user of the client device enters character strings in the two data entry fields and then submits a corresponding email capture request (the "Yes" branch of the query task 508. Referring again to FIG. 6, the "Yes" branch of task 508 may be associated with user interaction with the "Request Snapshot" button 618. In response to the submission of the email capture request, the process 500 acquires the first character string via the first data entry field (task 510) and acquires the second character string via the second data entry field (task 512).

The process 500 may then create email capture criteria based on the acquired character strings (task 514). In certain embodiments, the email capture criteria includes the received character strings as-is. Accordingly, the new capture request includes or defines the email capture criteria, which in turn includes or is otherwise based on the character string (or strings) acquired from the client device. It should be appreciated that an embodiment could utilize other email capture criteria if so desired. For example, the email capture criteria may designate, without limitation: an entire destination email address or any portion thereof; a specific email domain or any portion thereof; a specific email subdomain or any portion thereof; any character string (regardless of functional context) that appears in an email address; or the like.

The process 500 may continue by updating the GUI as needed to indicate the creation of the new capture request and to indicate the currently pending status of the new capture request (task 516). Referring to FIG. 6, for example, the status entry 612 corresponds to a pending capture request, whereas the status entries 608, 610 correspond to completed capture requests, i.e., capture requests for which the multi-tenant database system has already found a matching email message.

The process 500 may be repeated any number of times to configure and create a plurality of different email capture requests for monitoring incoming email messages. Although not always required, the embodiments presented here assume that each capture request is valid for one matched/captured email message. In other words, a capture request will remain pending until an incoming email satisfies the email capture criteria for that particular request. After a matching email has been detected, the corresponding email capture request is marked as "completed" and the multi-tenant database system stops searching for incoming emails that meet the associated capture criteria. Consequently, different capture requests can be created to monitor for email using different capture criteria. In certain situations, multiple redundant capture requests can be created if the user or system administrator wants to capture and review more than one incoming email that satisfies the same capture criteria.

Figure 7:
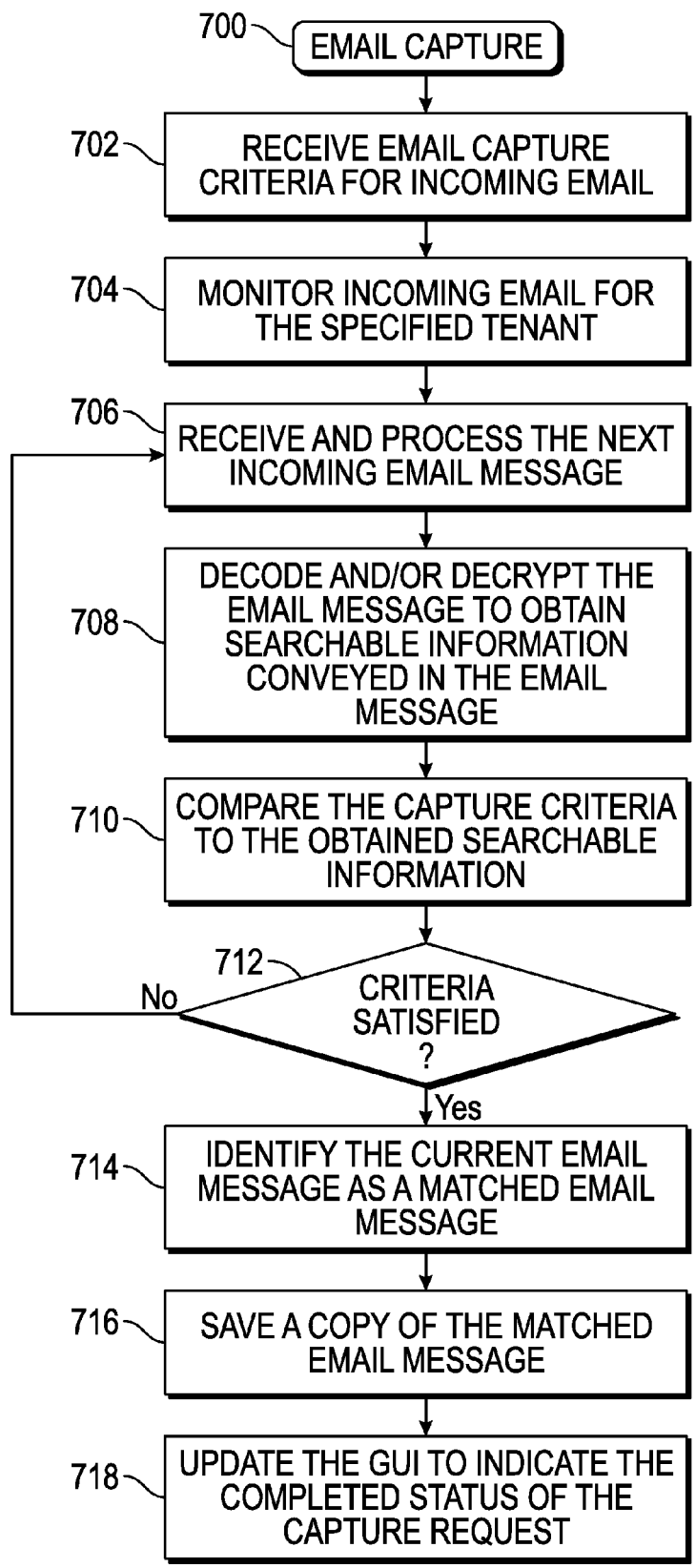
FIG. 7 is a flow chart that illustrates an embodiment of an email capture process.

FIG. 7 is a flow chart that illustrates an embodiment of an email capture process 700, which may be performed after one or more capture requests have been created. The process 700 assumes, therefore, that the host system has received or generated email capture criteria for incoming email directed to a destination tenant of a multi-tenant database system (task 702), and that the system monitors the incoming email for satisfaction of the email capture criteria (task 704). In this regard, the process 700 receives and processes the next incoming email message for the designated tenant (task 706) and decodes and/or decrypts the email message to obtain searchable information that is conveyed in the email message (task 708). Thus, task 706 may receive the incoming email message in an original format, and task 708 may decode the originally formatted email message to obtain the desired searchable information. The decoding associated with task 708 was described in more detail above with reference to FIG. 4. The process obtains the decoded email information and compares the email capture criteria to the email information (task 710). The comparison performed during task 710 seeks to identify when the incoming email matches the stated capture criteria. If the criteria is satisfied (the "Yes" branch of the query task 712), then the process identifies or flags the current email message as a matched email message (task 714). If the criteria is not satisfied (the "No" branch of the query task 712), then the process 700 may exit or return to task 706 to process the next incoming email message.

Satisfaction of the email capture criteria may require an exact and identical matching of some or all of the character string associated with the recipient email address, matching of some or all of the character string associated with the sender email address, matching of other user-specified information, or the like. For example, task 714 may identify the current email message as a matched email message when the searchable information in the current candidate email message matches the email capture criteria by at least some threshold amount. The threshold amount may correspond to the matching of a minimum number of data entry fields, or it may correspond to the number of characters that match within a user-entered character string. As another example, task 714 may identify a matched email message only when both the recipient email address and the sender email address matches the user-entered character strings for those fields. In accordance with certain practical embodiments, the character strings acquired from the data entry fields must be strictly found in an incoming email message in order for the process to indicate a match.

In connection with the identification of a matching email message, the process 700 may save a copy of the matched email message for purposes of diagnostic analysis, for archiving, for presentation to an administrator of the corresponding tenant, for display to the requesting user, or the like (task 716). The matched email message may be saved at the multi-tenant database system, at the client device, and/or at any storage element that is coupled to or otherwise associated with the multi-tenant database system. As shown in FIG. 6, each of the status entries 608, 610, 612 includes a respective status indicator 622, 624, 626 associated therewith. Thus, at the moment depicted in FIG. 6, two of the capture requests are completed and the third capture request is still pending. In this regard, the process 700 may update the GUI 600 to indicate the "Completed" status of the particular capture request (task 718). For the example described here, the GUI 600 is updated to change the status indicator for the capture request from "Pending" to "Completed".

Referring back to FIG. 4, the normal and usual incoming email processing is also performed (to the extent possible) on the matched email message. In other words, the multi-tenant database system will still attempt to process, route, and deliver the incoming email message to the intended recipient(s). Accordingly, the email capture functionality need not interfere with or otherwise impede the normal email processing flow of the multi-tenant database system.

It should be appreciated that a practical implementation of the process 700 will be designed to concurrently monitor for satisfaction of different capture criteria as needed. In other words, tasks 710 and 712 may be performed in a way that compares the searchable information to a plurality of different capture criteria associated with a plurality of distinct snapshot requests. The above description of the process 700 focuses on only one capture request for simplicity and ease of understanding.

Figure 8:
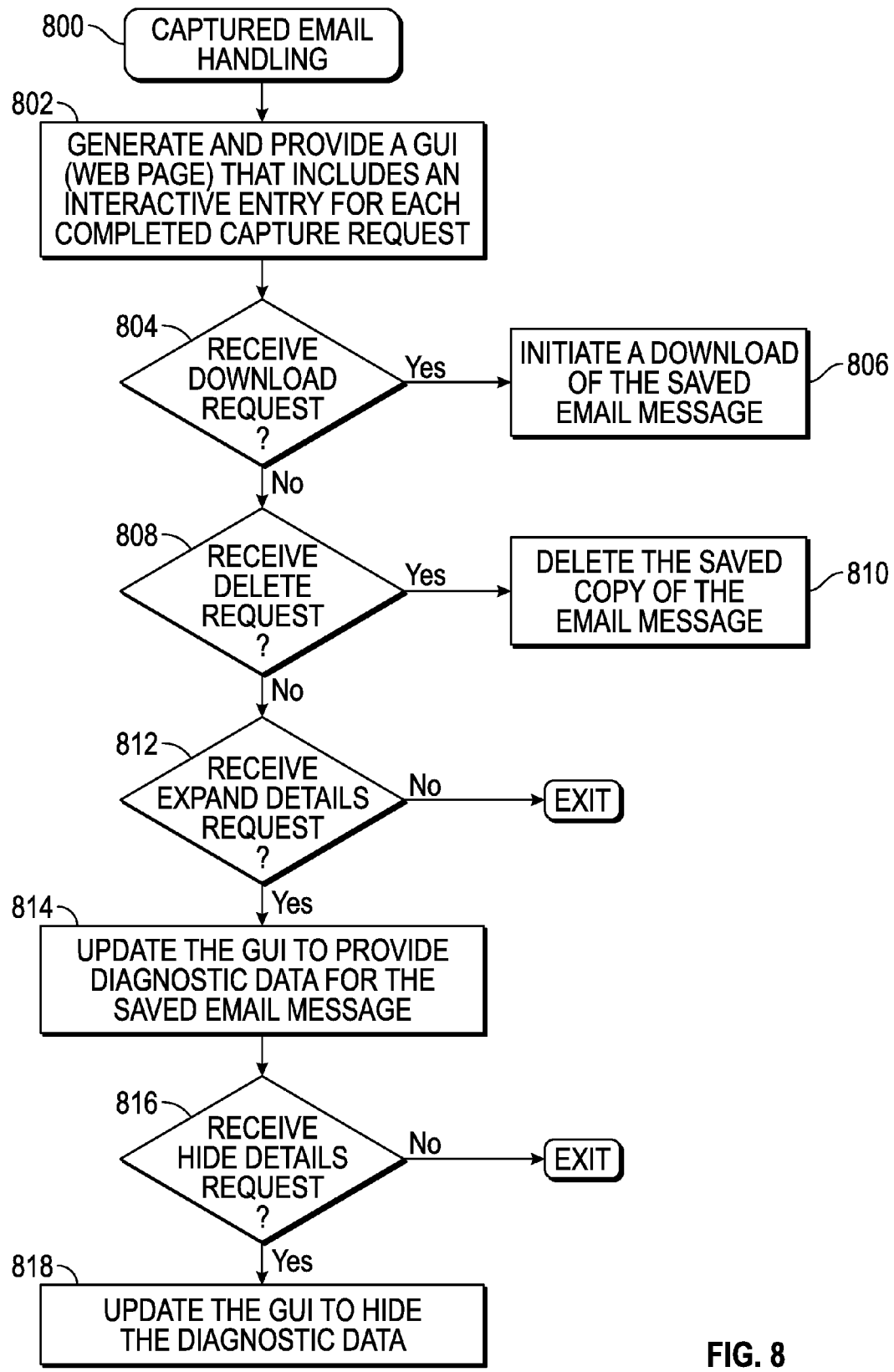
FIG. 8 is a flow chart that illustrates an embodiment of a captured email handling process.

This description assumes that at least one incoming email satisfies the stated email capture criteria of an email snapshot request. The multi-tenant database system provides a number of interactive features to enable the user or administrator to review the status of the email capture requests and to view certain diagnostic information regarding the matched email messages. In this regard, FIG. 8 is a flow chart that illustrates an embodiment of a captured email handling process 800, which may be performed by a system as described herein. The process 800 may begin by generating and providing a GUI, such as a web page, that includes an interactive entry for each completed email capture request (task 802). The GUI 600 shown in FIG. 6 represents one embodiment of a web page that could be generated in connection with task 802. For this particular embodiment, each entry for a completed email capture request is rendered with a "Delete" command element or link 630, a "Download" command element or link 632, and either a "Show Details" command element or link 634 or a "Hide Details" command element or link 636. These items may be rendered as interactive graphical elements that respond to user interaction (e.g., selection and clicking) to initiate certain actions associated with the particular email snapshot.

For example, the "Download" link 632 may be selected to initiate a download request for a saved email message. Accordingly, if the process 800 receives a download request from a client device (the "Yes" branch of query task 804), then the process 800 initiates a download of the saved copy of the email message to the requesting client device (task 806). The saved email message may be downloaded in any suitable format that is supported by the client device. As another example, the "Delete" link 630 may be activated to delete the corresponding saved email message. Thus, if the process 800 receives a delete request from a client device (the "Yes" branch of query task 808, then the process 800 responds by deleting the saved copy of the corresponding email message (task 810).

As yet another example, the "Show Details" link 634 may be selected to expand the respective status entry and to show additional information related to the corresponding saved email message. Thus, if the process 800 receives an expand details request from a client device (the "Yes" branch of query task 812), then the process 800 responds by providing diagnostic data regarding the saved copy of the matched email message to the requesting client device (task 814). For this particular embodiment, task 814 is associated with the updating of the GUI 600 to expand one of the status entries such that the expanded status entry includes the diagnostic data. The diagnostic data that is provided and shown to the user may vary from one embodiment to another, from one system to another, from one tenant to another, etc. In certain implementations, the diagnostic data may include some or all of the following types of data, without limitation: a send timestamp; a receive timestamp; a capture timestamp; a sender email address; a recipient email address; a portion of a sender email address; a portion of a recipient email address; a sender organization identifier; a recipient organization identifier; a sender email domain; a recipient email domain; email subject line content; email body content; email header content; email attachments; email attachment metadata; and delivery status information.

Referring again to FIG. 6, the status entry 608 is depicted in its expanded form within a diagnostic data field 640 that can be used to display the diagnostic data for the matched email message. For this simple example, the diagnostic data that is shown in the expanded view includes the email capture date, the full email address of the sender, and the full email address of the recipient. The user or system administrator can view this diagnostic data and use any or all of the diagnostic data to troubleshoot email delivery issues related to the processing of email for the given tenant of the multi-tenant database system. Referring back to query task 812, if the process 800 does not receive an expand details request, then the process 800 may exit or return to task 802 to update the GUI as needed before proceeding as described above.

The "Hide Details" link 636 (see FIG. 6) may be displayed when a status entry is in the expanded state. When displayed, the "Hide Details" link 636 can be activated by the user of the client device. Thus, if the process 800 receives a hide details request from a client device (the "Yes" branch of query task 816), then the process 800 responds by hiding the diagnostic data regarding the saved copy of the matched email message (task 818). In practice, task 818 may be associated with the collapsing of the selected status entry such that the diagnostic data field and the related information are hidden from view. For this particular embodiment, task 818 is associated with the updating of the GUI 600 to hide the diagnostic data. In response to hiding the diagnostic data, the GUI 600 may also be updated to replace the "Hide Details" link 636 with the "Show Details" link 634.

The subject matter presented herein provides a simple and easy-to-use graphical interface, such that an administrator or any designated user of a multi-tenant database system can create incoming email capture requests for purposes of identifying potential or existing email delivery issues. The email snapshot system captures copies of matched email messages that satisfy stated email capture criteria. Captured email messages can be reviewed along with their diagnostic information as needed to identify email transmission or handling issues. The methodology described herein is particularly useful in the context of a multi-tenant database system that supports a plurality of different tenants. Rather than having a general "email support" function to troubleshoot and diagnose email issues for all of the supported tenants, the multi-tenant database system can deploy the email capture and analysis system described herein and empower the individual tenant-based administrators. In other words, the IT personnel or system administrators at the tenant level can be enabled to handle many routine email delivery issues and troubleshooting.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible, non-transitory, processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing email, the method comprising:
   receiving email capture criteria for incoming email messages directed to a destination tenant of a multi-tenant database system, each of the incoming email messages having a recipient address ending with a common domain string that corresponds to the multi-tenant database system, and the email capture criteria received in an email capture request that is valid for only one captured email message;
   comparing the email capture criteria to searchable information conveyed in the incoming email messages;
   when the searchable information in a candidate email message of the incoming email messages matches the email capture criteria by at least a threshold amount, identifying the candidate email message as a matched email message;
   saving a copy of the matched email message;
   performing incoming email processing on the matched email message; and
   after the matched email message has been detected, indicating that the email capture request is completed.

2. The method of claim 1, further comprising:
   receiving the candidate email message in an original format as an originally formatted candidate email message; and
   decoding the originally formatted candidate email message to obtain the searchable information in the candidate email message.

3. The method of claim 1, further comprising:
   receiving a download request from a client device, the download request associated with the saved copy of the matched email message; and
   in response to receiving the download request, initiating a download of the saved copy of the matched email message to the client device.

4. The method of claim 1, further comprising:
   receiving a delete request from a client device, the delete request associated with the saved copy of the matched email message; and in response to receiving the delete request, deleting the saved copy of the matched email message.

5. The method of claim 1, further comprising:
receiving an expand details request from a client device, the expand details request associated with the saved copy of the matched email message; and
in response to receiving the expand details request, providing diagnostic data regarding the saved copy of the matched email message to the client device.

6. The method of claim 5, further comprising:
receiving a hide details request from the client device, the hide details request associated with the saved copy of the matched email message; and
in response to receiving the hide details request, hiding the diagnostic data regarding the saved copy of the matched email message to the client device.

7. The method of claim 5, wherein the providing step provides diagnostic data comprising data selected from a group consisting of: a send timestamp; a receive timestamp; a capture timestamp; a sender email address; a recipient email address; a portion of a sender email address; a portion of a recipient email address; a sender organization identifier; a recipient organization identifier; a sender email domain; a recipient email domain; email subject line content; email body content; email header content; email attachments; email attachment metadata; and delivery status information.

8. The method of claim 1, further comprising:
providing a graphical user interface (GUI) to a client device, the GUI comprising a data entry field to receive at least a portion of a recipient email address; and
acquiring a character string via the data entry field;
wherein the email capture criteria comprises the acquired character string.

9. The method of claim 1, further comprising:
providing a graphical user interface (GUI) to a client device, the GUI comprising a data entry field to receive at least a portion of a sender email address; and
acquiring a character string via the data entry field;
wherein the email capture criteria comprises the acquired character string.

10. A computer-implemented method for processing email, the method comprising:
providing a graphical user interface (GUI) to a client device, the GUI comprising at least one data entry field;
acquiring at least one character string via the at least one data entry field;
creating a capture request for incoming email messages directed to a destination tenant of a multi-tenant database system, wherein the capture request defines email capture criteria based on the acquired at least one character string, each of the incoming email messages having a recipient address ending with a common domain string that corresponds to the multi-tenant database system, and the capture request being valid for only one captured email message;
monitoring the incoming email messages for satisfaction of the email capture criteria;
identifying one of the incoming email messages as a matched email message when the email capture criteria is satisfied;
saving a copy of the matched email message; and
after the matched email message has been detected, indicating that the email capture request is completed.

11. The method of claim 10, further comprising:
performing incoming email processing on the matched email message.

12. The method of claim 10, further comprising:
providing, to the client device, diagnostic data regarding the saved copy of the matched email message.

13. The method of claim 10, wherein:
the GUI comprises a first data entry field to receive at least a portion of a recipient email address, and a second data entry field to receive at least a portion of a sender email address;
the acquiring step acquires a first character string via the first data entry field, and a second character string via the second data entry field; and
the email capture criteria comprises the acquired first character string and the acquired second character string.

14. A computer-implemented multi-tenant database system comprising a processor and a memory, wherein the memory comprises computer-executable instructions that, when executed by the processor, cause the multi-tenant database system to:
process incoming email messages directed to a plurality of different tenants supported by the multi-tenant database system;
receive, for a designated tenant supported by the multi-tenant database system, email capture criteria for incoming email messages directed to the designated tenant, each of the incoming email messages having a recipient address ending with a common domain string that corresponds to the multi-tenant database system, and the email capture criteria received in an email capture request that is valid for only one captured email message;
monitoring the incoming email messages for satisfaction of the email capture criteria;
identifying one of the incoming email messages as a matched email message when the email capture criteria is satisfied;
providing diagnostic data for the matched email message to a client device associated with the designated tenant; and
after the matched email message has been detected, indicating that the email capture request is completed.

15. The multi-tenant database system of claim 14, wherein the computer-executable instructions, when executed by the processor, cause the multi-tenant database system to:
save a copy of the matched email message; and
perform incoming email processing on the matched email message.

16. The multi-tenant database system of claim 14, wherein the email capture criteria comprises at least a portion of a recipient email address.

17. The multi-tenant database system of claim 14, wherein the nail capture criteria comprises at least a portion of a sender email address.

18. A computer-readable medium having computer-executable instructions that, when executed by a processor, perform a method of processing email, the method comprising:
receiving email capture criteria for incoming email messages directed to a destination tenant of a multi-tenant database system, each of the incoming email messages having a recipient address ending with a common domain string that corresponds to the multi-tenant database system, and the email capture criteria received in an email capture request that is valid for only one captured email message;
comparing the email capture criteria to searchable information conveyed in the incoming email messages;

identifying one of the incoming email messages as a matched email message when the email capture criteria is satisfied;

saving a copy of the matched email message for diagnostic analysis;

performing incoming email processing on the matched email message; and after the matched email message has been detected, indicating that the email capture request is completed.

19. The computer-readable medium of claim 18, wherein the method performed by the computer-executable instructions further comprises:

providing diagnostic data for the matched email message to a client device associated with the designated tenant.

20. The computer-readable medium of claim 18, wherein the method performed by the computer-executable instructions further comprises:

providing a graphical user interface (GUI) to the client device associated with the designated tenant;

wherein the GUI comprises data entry fields to acquire at least one character string utilized for the email capture criteria.

21. The computer-readable medium of claim 20, wherein the GUI comprises a status indicator to convey a current monitoring status for the email capture criteria.

22. The computer-readable medium of claim 20, wherein the GUI comprises a diagnostic data field to display the diagnostic data for the matched email message.

* * * * *